United States Patent [19]
Tyrrell

[11] Patent Number: 5,706,640
[45] Date of Patent: Jan. 13, 1998

[54] LANDSCAPING DEBRIS COLLECTING DEVICE

[76] Inventor: Charles M. Tyrrell, 1966 Suzanne St., Johns Island, S.C. 29455

[21] Appl. No.: 584,796

[22] Filed: Jan. 11, 1996

[51] Int. Cl.⁶ .................................................. A01D 07/00
[52] U.S. Cl. .............................. 56/400.01; 56/400.12; 294/50.6; D8/13
[58] Field of Search .................... 56/400.01, 400.12, 56/400.16, 400.04; 294/50.5, 50.6, 57, 50.8; D8/13

[56] References Cited

U.S. PATENT DOCUMENTS

| | | | |
|---|---|---|---|
| 2,180,544 | 11/1939 | Nissen | 56/400.01 |
| 4,378,670 | 4/1983 | Check et al. | 56/400.12 X |
| 4,866,922 | 9/1989 | Clark | 56/400.04 |
| 5,169,191 | 12/1992 | Benz | 294/50.8 X |

*Primary Examiner*—Terry Lee Melius
*Attorney, Agent, or Firm*—Dallis Law Firm, P.A.

[57] ABSTRACT

A landscaping debris collecting device for gathering and moving quantities of landscaping debris comprising a right and left plate member, each having an inside and outside face. Each member plate has a rake end and a contoured end, the contoured end of which is secured inside the palm of one's hand by securely holding a grasping ridge that protrudes out of the outside face of the plate member with one's finger tips while the opposing thumb rests upon the inside face of the plate member. The right and left plate members are used to collect quantities of landscaping debris by bringing together the right and left plates with one's right and left hand and sandwiching together landscaping debris.

9 Claims, 2 Drawing Sheets

5,706,640

LANDSCAPING DEBRIS COLLECTING DEVICE

BACKGROUND OF THE INVENTION

1. Field of the Invention

The present invention relates to the field of yard and landscaping tools and, more particularly, a landscaping debris collecting device.

2. Description of the Related Art

The landscaping maintenance of residential and commercial yards and grounds is a highly labor intensive task. The introduction of mechanized equipment and tools helps to reduce the labor necessary for the upkeep of such grounds. Certain tasks, however, remain time consuming and problematic by virtue of their very nature. The collecting and depositing of landscaping debris such as leaves, pine straw, grass clippings and other similar debris is an example of such a time consuming task. Although methods of piling and centralizing such debris have improved, the basic task of moving piled debris into a wheel barrow or other transporting device remains essentially the same. Historically, such debris is simply "scooped" with two bare hands, a pitch fork, a shovel or a leaf-rake with assistance from one hand. Surprisingly, among each of these aforementioned methods, using one's bare hands is often times the quickest and most effective means of collecting and depositing landscaping debris.

Among the patented prior art that exists in this field is U.S. Pat. No. 4,378,671 to Lorenzo Gascon which relates to a combination raking and scooping device. A conventional rake is modified with an auxiliary rake head used to scoop yard debris. The auxiliary rake head rests behind the conventional rake head and is hinged to the rake handle so that the operator may manipulate the auxiliary rake head to grab landscaping debris by sandwiching the debris between the two rake heads.

U.S. Pat. No. 4,520,621 to Gene R. Archer is a gardening tool that acts as both a raking device as well as a scooping device. This device has a flexible head that moves relatively easily over uneven terrain. A top cover made of a flexible mesh material holds the raked debris in place until the operator is prepared to scoop the material into a pile.

A non-patented device exists that is similar in operation but different in design to the present invention. This prior art device consists of two opposing right and left disc shaped tools with elongated, flexible teeth along a bottom edge. At first glance, the disc shaped tools look like two opposing plastic garbage can lids with a bottom row of elongated teeth. The left disc is held with the left hand and the right disc with the right hand. Landscaping debris is simply sandwiched between the two opposing discs and placed in a desired location. Although simplistic in appearance, the actual operation is not as effective as it could be because of poor ergonomics and design.

In each of the prior art references provided, and those reviewed, none combines the action of using one's hands and arms along with a practical hand-held tool designed to optimize the effectiveness of collecting landscaping debris. The present invention is comfortable to grasp with each hand and also designed with a row of rigid teeth near the bottom end of both the right and left units to make it easy to collect and even rake remaining landscaping debris. The inside face of the present invention is tapered inward slightly along the rigid teeth end to aid in "scooping" landscaping debris.

SUMMARY OF THE INVENTION

It is therefore an objective of this invention to provide an effective and efficient means of collecting and moving piles of landscaping debris.

It is further an objective of this invention to provide a landscaping debris collecting device designed with a comfortable grasping element.

These as well as other objectives are accomplished with a landscaping debris collecting device with opposing right and left plate members, each of which are easily grasped by one's right and left hand. Each right and left plate member has a rigid, inwardly tapered rake end designed with extended teeth that aid in collecting scattered debris. The top edge of the opposing plate members rests in the palm of one's hand while grasping a protruding handle with one's fingers. Each plate member is designed with a comfortable, ergonomic grasping means that incorporates a contoured end. Collecting landscaping debris is accomplished by simply sandwiching the debris between opposing right and left plate members.

BRIEF DESCRIPTION OF THE DRAWINGS

A preferred embodiment of the present invention is described herein reference to the drawings wherein.

DETAILED DESCRIPTION OF THE PREFERRED EMBODIMENT

Figure 1:
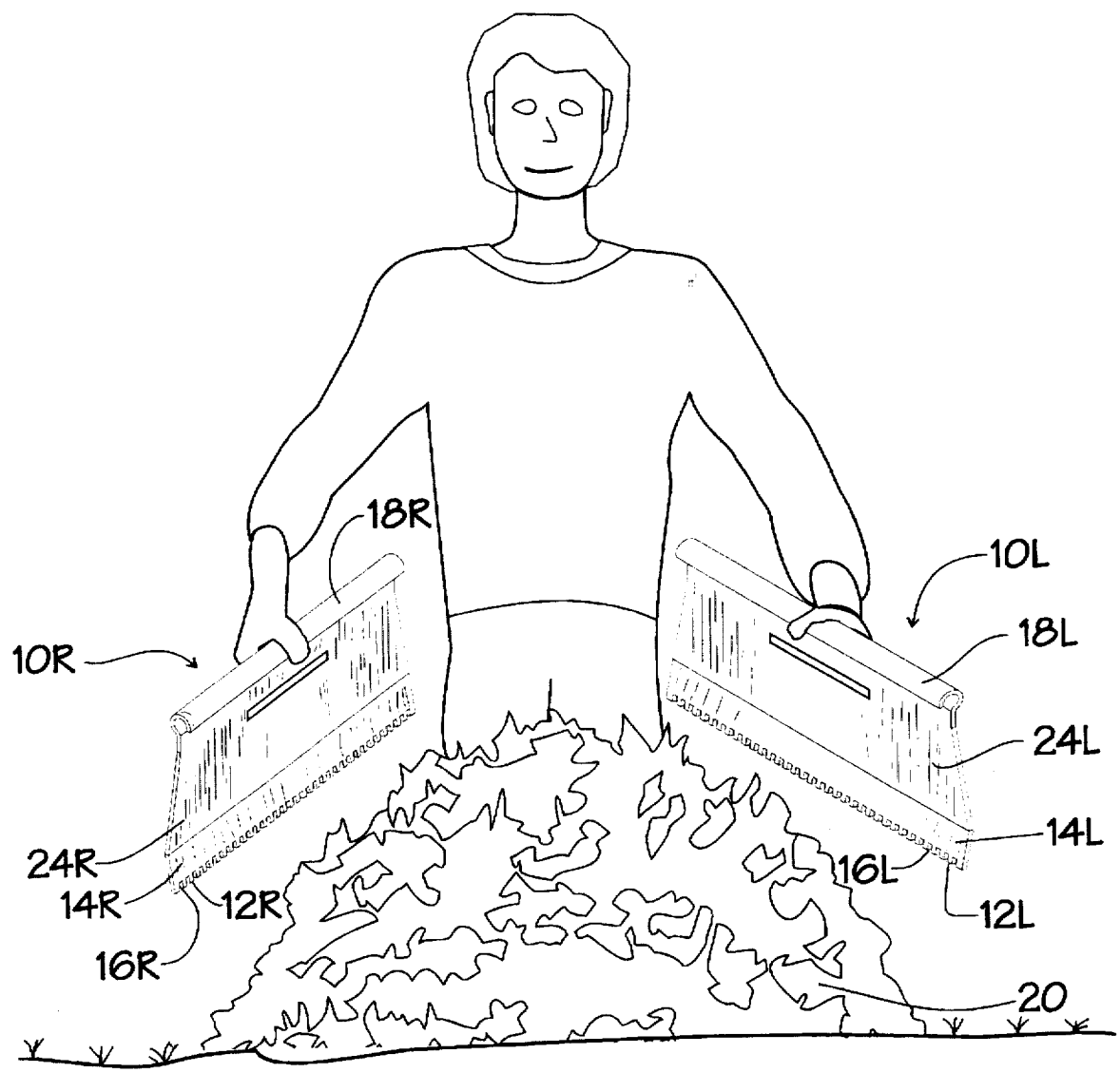
FIG. 1 of the drawings shows a perspective view of both the right and left plate members of the device being held, as intended, above a pile of yard debris.
Figure 2A:
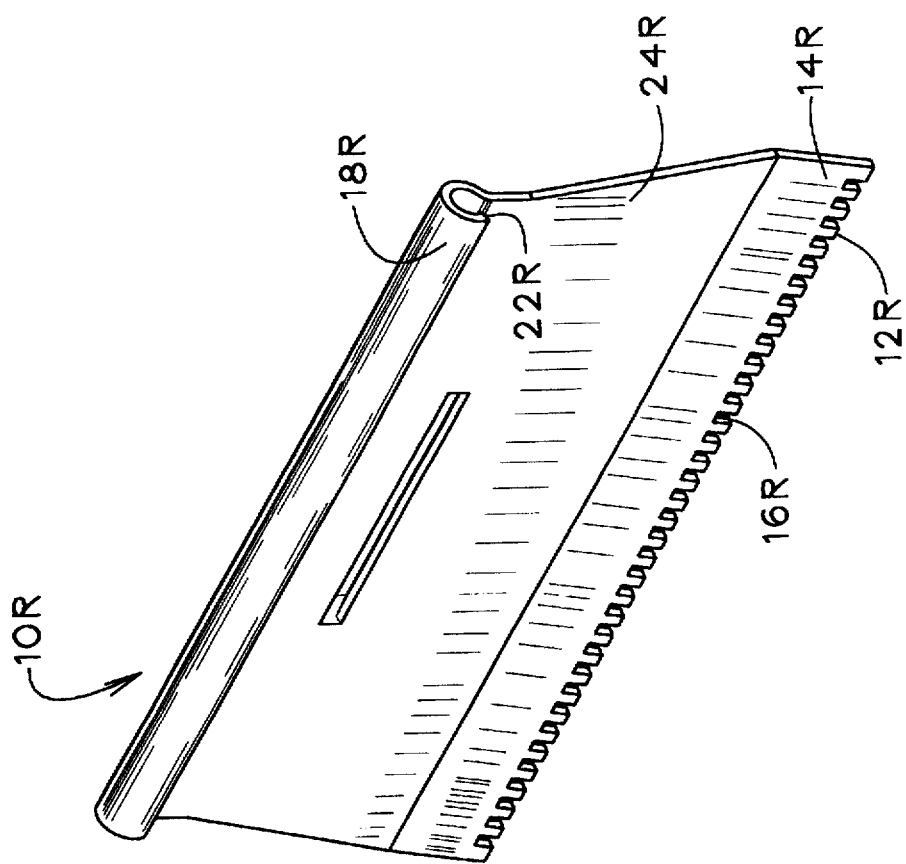
FIG. 2a of the drawings shows a perspective view of the right plate member of the device showing the inside face of the device.
Figure 2:
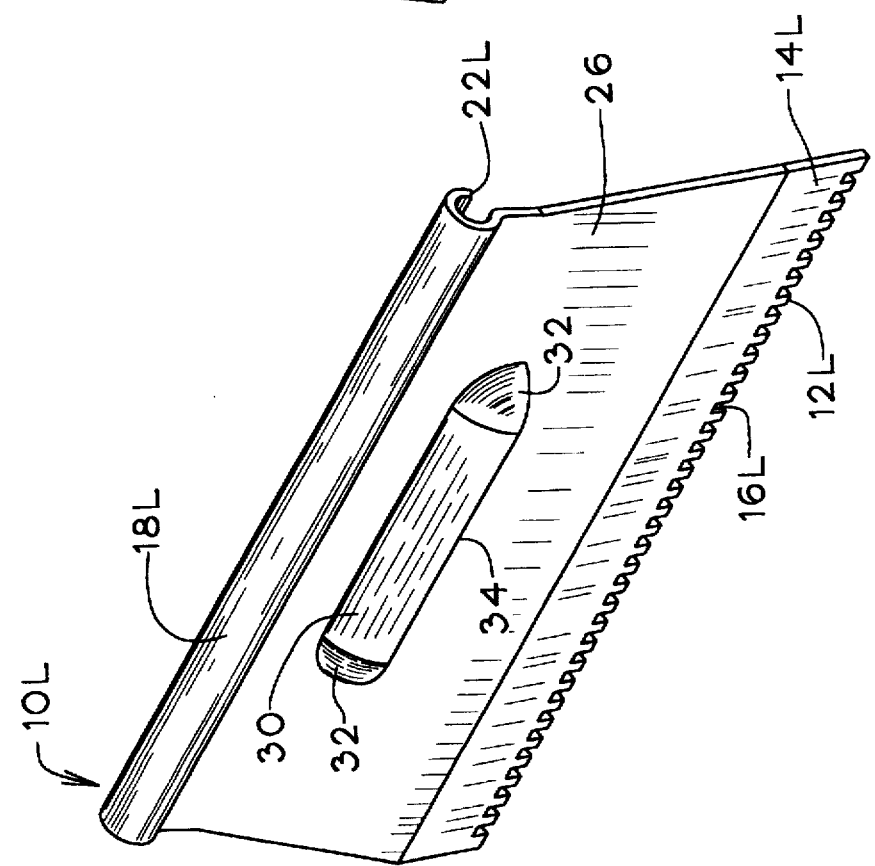
FIG. 2 of the drawings shows a perspective view of the left plate member of the device showing the outside face along with a grasping element.

Referring to the drawings by numerals of reference, there is shown in FIG. 1, FIG. 2 and FIG. 2a the landscaping debris collecting device, right and left plate members (10R and 10L). Each right and left plate members (10R and 10L) have an outside face (26), an inside face (24R and 24L), a rake end (14L and 14R), a grasping ridge (30) and a contoured end (18R and 18L).

Referring to FIG. 1, the right and left plate members of the landscaping debris collecting device (10R and 10L) are held, as designed, with inside face (24R and 24L) open to collect landscaping debris (20). The right plate member (10R) is grasped with the right hand by securing the contoured end (18R) in the palm of one's right hand. The left plate member (10L) is held in the same fashion by one's left hand securing the left contoured end (18L) in the palm of one's left hand.

The means for securing the right and left plate members (10R and 10L) in one's right and left hand is accomplished by grasping the grasping ridge (30) as depicted in FIG. 2. The grasping ridge (30) and grasping ridge corners (32) comprise a protrusion extending out of the outside face (26) of both right and left plate members (10R and 10L) of the landscaping debris collecting device. The user places his or her finger tips around the grasping ridge lip (34) and grasping the grasping ridge (30) with the result of pushing the contoured end (18R and 18L) securely into the palm of the user's hand. The contoured end (18R and 18L) is ergonomically designed with an contoured lip (22R and 22L) to maximize the comfort of holding and using the landscaping debris collecting device (10R and 10L).

Referring to FIGS. 1, 2 and 2a, the means for collecting landscaping debris can be described. Both right and left plate members (10R and 10L) of the landscaping debris collecting device are designed with a rake end (14R and 14L) running along the bottom edge of the right and left plate members (10R and 10L). The rake end (14R and 14L) contains a plurality of teeth (12R and 12L) and associated channels (16R and 16L). The rake end (14R and 14L) angled slightly inward toward the inside face (24R and 24L) of the landscape debris collecting plate members (10R and 10L). Such a design aids in collecting landscaping debris (20) by enhancing the scooping effect of the right and left plate members (10R and 10L). A pile of landscaping debris can be scooped up by sandwiching the debris together between the inside faces (24R and 24L) of the right and left plate members (10R and 10L) of the landscaping debris collecting device.

Finally, the rake end (14R and 14L) is supplied with teeth (12R and 12L) and channels (16R and 16L) to aid in collecting and raking landscaping debris (20) that may remain at the bottom of a pile on the ground surface. The teeth (12R and 12L) are rigid in design and will withstand forceful raking action by the user.

A preferred embodiment of the present invention is described herein. It is to be understood, of course, that changes and modifications may be made in the embodiment without departing from the true scope and spirit of the present invention as defined by the appending claims.

That which is claimed is:

1. A landscaping debris collecting device having a right and left plate member, each said right and left plate member comprising, in combination:
   a. a top contoured end, middle plate portion and a bottom rake end, said bottom rake end having a plurality of teeth extending downward from said bottom rake end;
   b. an inside and outside face, said outside face having a grasping ridge secured to said middle plate portion such that fingers and an opposing thumb of a human hand can grasp said grasping ridge when said top contoured end rests in a palm of said human hand and said top contoured end is between said fingers extending along said outside face and said opposing thumb extending along said inside face.

2. A landscaping debris collecting device as claimed in claim 1 wherein said top contoured end comprises an extension of said middle plate portion curving inwardly toward said inside face, running lengthwise along said middle plate portion of said plate member.

3. A landscaping debris collecting device as claimed in claim 1 wherein said bottom rake end is angled slightly inward in the direction of said inside face.

4. A landscaping debris collecting device as claimed in claim 1 wherein said grasping ridge is centrally located on said outside face of said plate member and comprises:
   a. a grasping ridge lip located between 10 and 40 millimeters from said outside face of said middle plate portion of said plate member;
   b. first and second grasping ridge edge further securing said grasping ridge and grasping ridge lip to said outside face of said middle portion of said plate member.

5. A landscaping debris collecting device as claimed in claim 1 wherein said right and left plate members are made of a rigid plastic material.

6. A landscaping debris collecting device having a right and left plate member, each said right and left plate member comprising, in combination:
   a. a top contoured end, middle plate portion and a bottom rake end, said bottom rake end having a plurality of teeth extending downward from said bottom rake end;
   b. an inside and outside face, said outside face having a grasping ridge secured to said middle plate portion such that fingers and an opposing thumb of a human hand can grasp said grasping ridge when said top contoured end rests in a palm of said human hand and said top contoured end is between said fingers extending along said outside face and said opposing thumb extending along said inside face, said top contoured end further comprising an extension of said middle plate portion curving inwardly toward said inside face, running lengthwise along said middle plate portion of said plate member.

7. A landscaping debris collecting device as claimed in claim 6 wherein said bottom rake end is angled slightly inward in the direction of said inside face.

8. A landscaping debris collecting device as claimed in claim 7 wherein said grasping ridge is centrally located on said outside face of said plate member and comprises:
   a. a grasping ridge lip located between 10 and 40 millimeters from said outside face of said middle plate portion of said plate member;
   b. first and second grasping ridge edge further securing said grasping ridge and grasping ridge lip to said outside face of said middle portion of said plate member.

9. A landscaping debris collecting device as claimed in claim 7 wherein said right and left plate members are made of a rigid plastic material.

* * * * *